(12) United States Patent
Babikyan et al.

(10) Patent No.: US 10,999,443 B1
(45) Date of Patent: May 4, 2021

(54) ON PREMISES GATEWAYS INTERCONNECTING VOIP SYSTEMS THE PUBLIC SWITCHED TELEPHONE NETWORK AND PRIVATE BRANCH EXCHANGES AND OTHER TELEPHONY INFRASTRUCTURE

(71) Applicant: Dialpad, Inc., San Francisco, CA (US)

(72) Inventors: Armen Babikyan, San Francisco, CA (US); Joshua Chiet, San Francisco, CA (US); John Rector, San Francisco, CA (US)

(73) Assignee: DIALPAD, INC., San Ramon, CA (US)

( * ) Notice: Subject to any disclaimer, the term of this patent is extended or adjusted under 35 U.S.C. 154(b) by 0 days.

(21) Appl. No.: 16/182,603

(22) Filed: Nov. 6, 2018

(51) Int. Cl.
*H04M 7/00* (2006.01)
*H04L 29/06* (2006.01)

(52) U.S. Cl.
CPC ......... *H04M 7/0069* (2013.01); *H04M 7/009* (2013.01); *H04L 29/06* (2013.01)

(58) Field of Classification Search
None
See application file for complete search history.

(56) References Cited

U.S. PATENT DOCUMENTS

| | | | | |
|---|---|---|---|---|
| 6,597,686 B1* | 7/2003 | Smyk | ................ | H04L 12/6418 370/252 |
| 6,865,266 B1* | 3/2005 | Pershan | ............. | H04M 3/42297 379/201.01 |
| 7,277,421 B1* | 10/2007 | Pershan | ............. | H04M 3/42297 370/252 |
| 7,586,899 B1* | 9/2009 | Mohaban | .......... | H04L 29/06027 370/352 |
| 7,965,699 B1* | 6/2011 | Accardi | ................. | H04L 45/24 370/351 |
| 9,264,299 B1* | 2/2016 | Palmer | ................ | H04L 41/0654 |
| 9,331,888 B1* | 5/2016 | Conway | ............. | H04L 65/1046 |
| 9,443,010 B1* | 9/2016 | Sundeby | ............... | G06F 16/784 |
| 2002/0118671 A1* | 8/2002 | Staples | ................... | H04L 69/16 370/352 |
| 2003/0053442 A1* | 3/2003 | Purpura | ................ | H04M 7/006 370/352 |
| 2003/0072300 A1* | 4/2003 | Kwon | ..................... | H04M 3/46 370/352 |
| 2003/0072301 A1* | 4/2003 | Ko | .................... | H04L 29/06027 370/352 |
| 2004/0266426 A1* | 12/2004 | Marsh | ............... | H04W 36/0066 455/426.2 |
| 2005/0041642 A1* | 2/2005 | Robinson | ................ | H04L 12/66 370/352 |
| 2006/0013195 A1* | 1/2006 | Son | ....................... | H04L 65/104 370/352 |

(Continued)

OTHER PUBLICATIONS

"SIP Trunking 101: the Fundamentals", https://www.sip.us/blog/latest-news/sip-trunking-101-the-fundamentals/, SIP. US, LLC, Jan. 16, 2017, Accessed Sep. 26, 2019, 6 pgs.

(Continued)

*Primary Examiner* — Bob A Phunkulh
(74) *Attorney, Agent, or Firm* — Patent Law Works LLP

(57) ABSTRACT

On premises gateways located within organization sites interconnect VoIP systems, the public switched telephone network (PSTN), Private Branch Exchanges and other telephony infrastructure.

19 Claims, 3 Drawing Sheets

(56) References Cited

U.S. PATENT DOCUMENTS

| | | | |
|---|---|---|---|
| 2006/0159062 A1* | 7/2006 | Huang | H04L 65/1069 370/352 |
| 2007/0201651 A1* | 8/2007 | Bontempi | H04M 3/42042 379/142.02 |
| 2008/0056235 A1* | 3/2008 | Albina | H04M 7/123 370/352 |
| 2008/0089494 A1* | 4/2008 | Kaas | H04L 41/28 379/93.02 |
| 2009/0022149 A1* | 1/2009 | Rosenberg | H04M 7/0057 370/389 |
| 2009/0046845 A1* | 2/2009 | Lewis | H04L 65/1069 379/220.01 |
| 2009/0080411 A1* | 3/2009 | Lyman | H04W 28/0215 370/352 |
| 2009/0180600 A1* | 7/2009 | Blackwell | H04M 15/00 379/114.28 |
| 2010/0082828 A1* | 4/2010 | Jennings | H04L 63/08 709/229 |
| 2010/0162034 A1* | 6/2010 | Degenhardt | H04L 65/1053 714/4.11 |
| 2010/0223494 A1* | 9/2010 | Degenhardt | H04L 65/1053 714/4.1 |
| 2010/0290609 A1* | 11/2010 | Clark | H04M 3/42238 379/142.07 |
| 2011/0280390 A1* | 11/2011 | Lawson | G06F 9/5077 379/220.01 |
| 2011/0283259 A1* | 11/2011 | Lawson | H04M 15/68 717/121 |
| 2011/0299548 A1* | 12/2011 | Chen | G06F 21/6245 370/401 |
| 2014/0313941 A1* | 10/2014 | Dwarkha | H04L 65/1053 370/259 |
| 2015/0296079 A1* | 10/2015 | Song | H04M 3/436 370/259 |
| 2019/0158371 A1* | 5/2019 | Dillon | H04L 47/27 |

OTHER PUBLICATIONS

Ying-Hui Chen, "5 Analog Telephone Adapters (ATA) Under $60 for Small-to-Medium Businesses", VoIP Insider, https://www.voipsupply.com/blog/voip-insider/5-analog-telephone-adapters-ata-60-small-medium-businesses/, Jan. 11, 2018, Accessed Sep. 26, 2019, 6 pgs.

"Digital and Analog Media Gateways Mediapack 1288", AudioCodes Limited, https://web.archive.org/web/20190602094921/https://www.audiocodes.com/solutions-products/products/digital-and-analog-media-gateways/mediapack-1288, WayBackMachine Jun. 2, 2019, Accessed Jan. 2, 2020, 6 pgs.

"OBihai OBi508vs—8 FXS Analog Gateway for VoIP", https://www.voipsupply.com/obihai-obi508vs, Accessed Oct. 3, 2019, 2 pgs.

\* cited by examiner

ON PREMISES GATEWAYS INTERCONNECTING VOIP SYSTEMS THE PUBLIC SWITCHED TELEPHONE NETWORK AND PRIVATE BRANCH EXCHANGES AND OTHER TELEPHONY INFRASTRUCTURE

TECHNICAL FIELD

This disclosure pertains generally to Voice over Internet Protocol (VoIP) technology, and more specifically to on premises gateways that interconnect VoIP systems, the public switched telephone network (PSTN), Private Branch Exchanges and other telephony infrastructure.

BACKGROUND

Voice over Internet Protocol enables the delivery of voice communication over Internet Protocol (IP) networks, such as the public internet or private IP networks, as opposed to conventional public switched telephone network (PSTN). Processing VoIP telephone calls involves signaling, channel setup, digitization of the analog voice signals and encoding. Instead of being transmitted over a circuit switched network, the digital information is packetized, and IP packets are transmitted over a packet switched network. Contemporary providers of VoIP enable dynamic interconnection between users on any two domains on the internet, using VoIP phones, or VoIP software running on personal computers, smart phones or other devices capable of running applications and connecting to a network.

VoIP has many advantages over conventional PSTN telephony, including bandwidth efficiency, pricing, convenience and the availability of many additional features. Many contemporary organizations are switching their telephony systems and service from PSTN to VoIP. However, some organizations cannot readily terminate their current PSTN telephone service (or, for that matter, switch between one VoIP service provider and another). For example, regulations in some jurisdictions prohibit or limit porting telephone numbers. This can be an issue because an organization may have a hard requirement of keeping its existing numbers. Further, an organization may have a business need to have regional as opposed to VoIP phone numbers, e.g., to appear more "professional." Local regulations may dictate that origination-level telephony service must be delivered to the site of the organization. Organizations may be locked into long term contractors with providers of telephone service.

Thus, an organization may wish to utilize a given VoIP system while at the same time maintaining its current telephone service. However, this can result in certain incompatibilities. An organization's current telephony infrastructure and a given target VoIP system may not be wholly compatible. For example, many roles or functionalities performed by one system cannot be extended to or substituted with the other using conventional means or techniques.

In addition, some organizations move to VoIP or to a new VoIP system in stages, keeping their existing private branch exchange (PBX), while at the same time adding some VoIP telephony service from a target VoIP system. A PBX is a telephone exchange system that serves an organization and performs concentration of central office lines or trunks to provide intercommunication between a large number of telephones in the organization. The central office lines provide connections to the PSTN. The concentration aspect of a PBX permits the shared use of these lines between all telephone stations in the organization. Its intercommunication ability allows two or more telephones to directly connect without using the public switched telephone network, often using four or five digit extensions, rather than full telephone numbers. Conventionally, the use of such extensions and certain other PBX-level functionality is not supported outside of the PBX (e.g., by external VoIP telephony devices connecting to telephones that are part of the PBX exchange).

It would be desirable to address these issues.

SUMMARY

According to various implementations and variations, an on premises gateway (OPG) is located within an organization site, and interconnects a VoIP system with telephone service (e.g., PSTN service) provided by the organization's telephone service provider. The OPG supports inbound and outbound calling through the VoIP system and the organization's telephone service provider. The OPG can provide services such as the porting of telephone numbers assigned by the organization's telephone service provider to other telephones, including VoIP telephony devices, without the numbers being reassigned by the organization's telephone service provider. The OPG can support calling of emergency service numbers, toll free numbers and local service numbers through the VoIP system, which is not otherwise possible in some jurisdictions. The OPG can ensure that proper caller ID information is passed to destination telephone networks from calls originating in the VoIP system, as well as enable callers outside of the VoIP system 105 to be shown detailed information concerning parties they are in the process of calling (e.g., name, picture, title, etc.), before a call has been answered. The OPG can extend the use of four or five digit extensions to VoIP telephony devices and other telephones operating outside of a PBX. Furthermore, the OPG can enable secure transfer of calls between the OPG and multiple subsystems within the VoIP system.

In some implementations, the OPG can replace a PBX within an organization's site, and interconnect the VoIP system, various telephones and the PSTN (or other telephone system to which the organization receives access from its telephone service provider). In other implementations, the organizations PBX remains in place, and the OPG interconnects the PBX and the VoIP system. In yet other implementations, the OPG interconnects the PBX, the PSTN (or other type of telephone network) and the VoIP system.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

Figure 1:
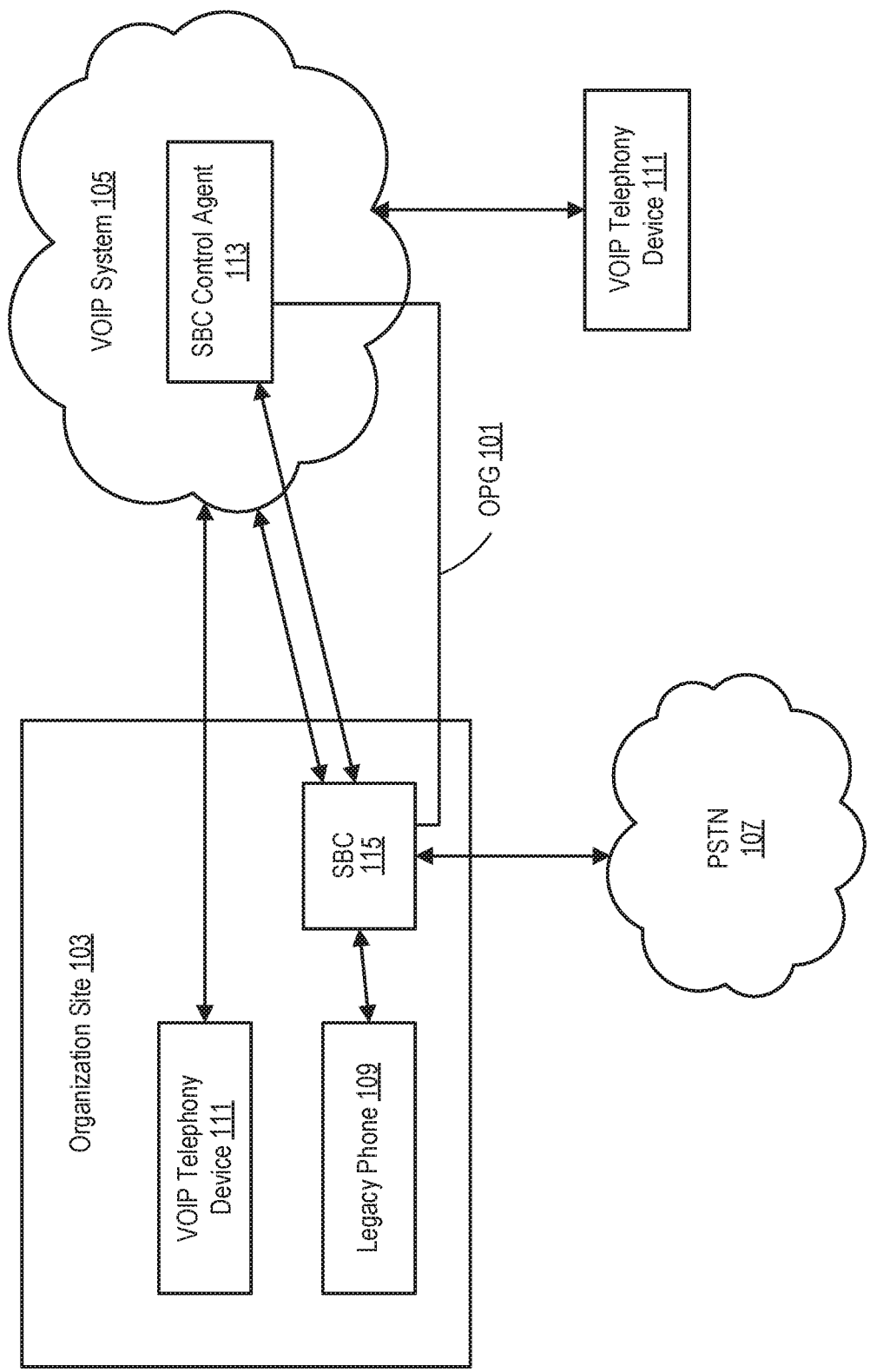
FIG. 1 is a block diagram illustrating an on premises gateway device (OPG) deployed at an organization site, and interconnecting a VoIP system, a PSTN and various telephony devices, according to some implementations.

FIG. 1 is a block diagram illustrating an exemplary on premises gateway device (OPG) 101 deployed in an organization site 103, and interconnecting a VoIP system 105, a PSTN 107, VoIP telephony devices 111 and legacy telephones 109, according to some implementations. A VoIP telephony device 111 can be a VoIP phone, or a network enabled computing device running VoIP software. The OPG 101 can be implemented as hardware, software and/or firmware. In one implementation, the OPG 101 is in the form of an OPG control agent 113 running on a computing device, which can be located for example at a remote site connected to the organization site 103 over a network (e.g., in the cloud), in combination with a hardware Session Boarder Controller (SBC) 115, such as, for example, an SBC 115 of the type currently available from vendors such as Audio-Codes or Sonus. It is to be understood that although the OPG 101, OPG control agent 113 and the SBC 115 are illustrated as individual entities, each of these entities represents a collection of functionalities, which can be instantiated as single or multiple components and/or modules as desired. It is to be understood that the OPG control agent 113 can be instantiated as software, firmware, hardware or any combination of these. It is to be understood that the OPG control agent 113 can be instantiated (for example as object code or executable images) within the system memory (e.g., RAM, ROM, flash memory) of any computing device, such that when the processor of the computing device executes, interprets or otherwise processes content of the OPG control agent, the computing device executes the associated functionality. It is to be understood that although a single SBC 115 is illustrated in FIG. 1, an OPG 101 can include multiple SBCs 115 (e.g., multiple communicatively coupled devices), or can include other and/or additional devices capable of connecting to telephones and/or telephone networks. Which features are performed by the OPG control agent 113 and which by the underlying SBC 115 (or other device) under the control of the OPG control agent 113 varies between implementations.

The OPG 101 is installed at an organization site 103 configured for telephony, such as a building or other physical location within an organization containing telephones, a PBX or similar mechanism for managing telephony exchange within the site 103, and a PSTN circuit connecting the site 103 to the PSTN 107. Some examples of organization sites 103 that can be configured for telephony are individual building, other forms of installations, or sections thereof on the premises or under the management of an enterprise, university, government, department, etc. In the example implementation illustrated in FIG. 1, the OPG 101 replaces the conventional PBX (not illustrated in FIG. 1). The OPG 101 communicates with the PSTN 107, for example by using Time-division Multiplexing (TDM). The OPG 101 also communicates with the VoIP system 105, for example using Session Initiation Protocol (SIP).

As illustrated in FIG. 1, the OPG 101 can manage both legacy telephones 109 and VoIP telephony devices 111. VoIP telephony devices 111 within or outside of the organization site 103 can connect to the VoIP system 105, which connects to the OPG 101. Legacy telephones 109 within the organization site 103 can connect to the OPG 101, which can interconnect them to the PSTN 107 or the VoIP system 105. It is to be understood that although FIG. 1 illustrates the OPG 101 being connected to the PSTN 107, in other implementations the organization could receive its phone service through a VoIP provider separate from the VoIP system 105, in which case the OPG 101 could instead connect to the external telephone system using, e.g., SIP. In this scenario, the OPG 101 could still provide the same functionalities described below.

The OPG 101 enables the organization to maintain and use its phone numbers assigned by its telephone service provider with VoIP telephony devices 111 communicating through the VoIP system 105, without the need for the organization's telephone service provider to port those telephone numbers. Instead, the OPG 101 can associate given numbers with specific VoIP telephony devices 111, and route inbound calls placed to the given numbers to the specific VoIP telephony devices 111 associated with those numbers, without requiring that the organization's telephone service provider port the numbers, or even be aware that the numbers have been assigned to the VoIP telephony devices 111 at all. It is to be understood that the OPG 101 can also continue to support legacy telephones 109 within the organization site 103. For example, some numbers assigned by the organization's telephone service provider can remain associated with legacy telephones 109, and the OPG 101 can route inbound calls to these legacy telephones 109. In a scenario where the organization's telephone service provider is a VoIP service provider, the same is true for continued support of VoIP phones within the organization site 103 with numbers assigned by organization's telephone service provider.

In a similar manner, the OPG 101 can also process outbound calls from VoIP telephony devices 111 (and/or legacy telephones 109) associated with numbers assigned by the PSTN service provider. Outbound calls placed by a VoIP device 111 associated with a given number can be routed by the VoIP system 105 to the OPG 101, which can then route the call to a destination telephone such that its originating number is the number assigned by the PSTN service provider. Such routing can be through either the VoIP system 105 or the PSTN 107, depending upon the destination. Calls from legacy telephones 109 can be processed by the OPG 101, and routed to their destination through the PSTN 107 or the VoIP system 105.

It is to be understood that by using the above-described functionality the OPG 101 can reassign telephone numbers provided by the organization's telephone service provider as desired, thereby porting specific numbers to specific VoIP telephony devices 111 utilizing the VoIP system 105 for any length of time, from an individual session to indefinitely. This is key, because in some jurisdictions or under certain contracts, the porting of the numbers by the organization's telephone service provider is not possible or practicable.

Another functionality that can be provided by the OPG 101 in this context is support for calling emergency services numbers (e.g., 911 in the US, 119 in Japan, 112 in much of Europe, 123 in Egypt, etc.) from the VoIP system 105.

Although in some jurisdiction such as the US emergency service numbers are generally supported over VoIP, in some other jurisdictions calls to emergency service numbers are not accepted from VoIP systems 105 (or other telephony networks outside of the PSTN 107), but instead only from PSTN telephony devices (e.g., land lines receiving service from a PSTN service provider). The OPG 101 enables access to calls to emergency numbers made through the VoIP system 101 by accessing the PSTN 107 (e.g., using TDM) and routing the call to the emergency service provider through the PSTN 107. Thus, the OPG 101 routes the call from the VoIP system 105 to the emergency service number through the PSTN 107, rather than through the VoIP system 105 from which it originated but would not be accepted.

The same issue occurs in some jurisdictions with calls to toll-free numbers (e.g., 800 numbers in the US and China, 0800 numbers in Japan and the UK, 1800 number in Australia, etc.). In some jurisdictions, calls to such numbers are only accepted through the PSTN 107, not from VoIP systems 105. As with calls to emergency service numbers, the OPG 101 provides access to calls to toll free numbers made through the VoIP system 101 by routing the call through the PSTN 107. The same problem and solution is also applicable in some jurisdictions for calls to local service numbers (e.g., numbers to request non-emergency assistance, municipal information, weather forecast, correct time, directory assistance, traffic information, report a gas leak, etc.).

Another functionality that can be performed by the OPG 101 is provision of coherent caller id information for calls originating from the VoIP system 105. Least cost routing (LCR) is the process of selecting the path for traffic based on cost. According to LCR, routes can be selected and updated (monthly, weekly, daily, etc.) from different carriers for destinations across the world. Telephone service providers buy routes from other providers, who in turn buy from other providers, etc. Neither the VoIP system 105 nor the PSTN 107 have full information of what carriers will be serving routes up and down stream. As calls are routed between carriers, caller id information associated with a given call can be changed, dropped or otherwise processed. For example some telephone networks in some countries do not allow caller-ID spoofing, and may even limit or prohibit the passing of caller ID information into their telephone network from outside of it, instead replacing the caller id information to indicate that the caller is international, anonymous, etc. As a result, caller id information can be mangled or altered as calls are routed between carriers.

To address this issue, the OPG 101 can connect directly to a telephone network that limits, blocks or otherwise alters caller id information, and provide the desired caller id information from calls being placed through the OPG 101, including calls originating from VoIP telephony devices 111 outside of the organization site or other calls originating from the VoIP system 105. Without the OPG 101 providing this functionality, it is unpredictable what caller id information would be displayed for these calls by the receiving telephone.

The OPG 101 can also extend services provided by the VoIP system 105 to legacy telephones 109 (or other types of telephony devices) within the organization site 103 that communicate with the PSTN 107 (or other type of telephone network made accessible to the organization through its telephone service provider). For example, one feature available on some VoIP systems 105 is the display of information concerning the party being called, before the call is placed. When the caller enters a number (or even a section of a number) on a VoIP telephony device 111, the VoIP system 105 may provide information concerning the party to whom the call is being made, such as name, picture, title, etc., which is displayed by the VoIP telephony device 111 for the benefit of the caller. This information can be displayed prior to the call being answered. Conventionally, when a caller operating a legacy phone 109 within the organization site 103 places a call, such information would not be available. The same is true of any call not originating from the VoIP system 105. However, when a call is made from a legacy phone 109 (or other type of telephone) through the OPG 101, the OPG can obtain the information concerning the party being called based on the number from the VoIP system 105 and pass that information back to the legacy phone 109, where it can be displayed to the caller. In other words, the OPG 101 extends a service of the VoIP system 105 to phones outside of the VoIP system 105, to which such services would not otherwise be available.

Figure 2:
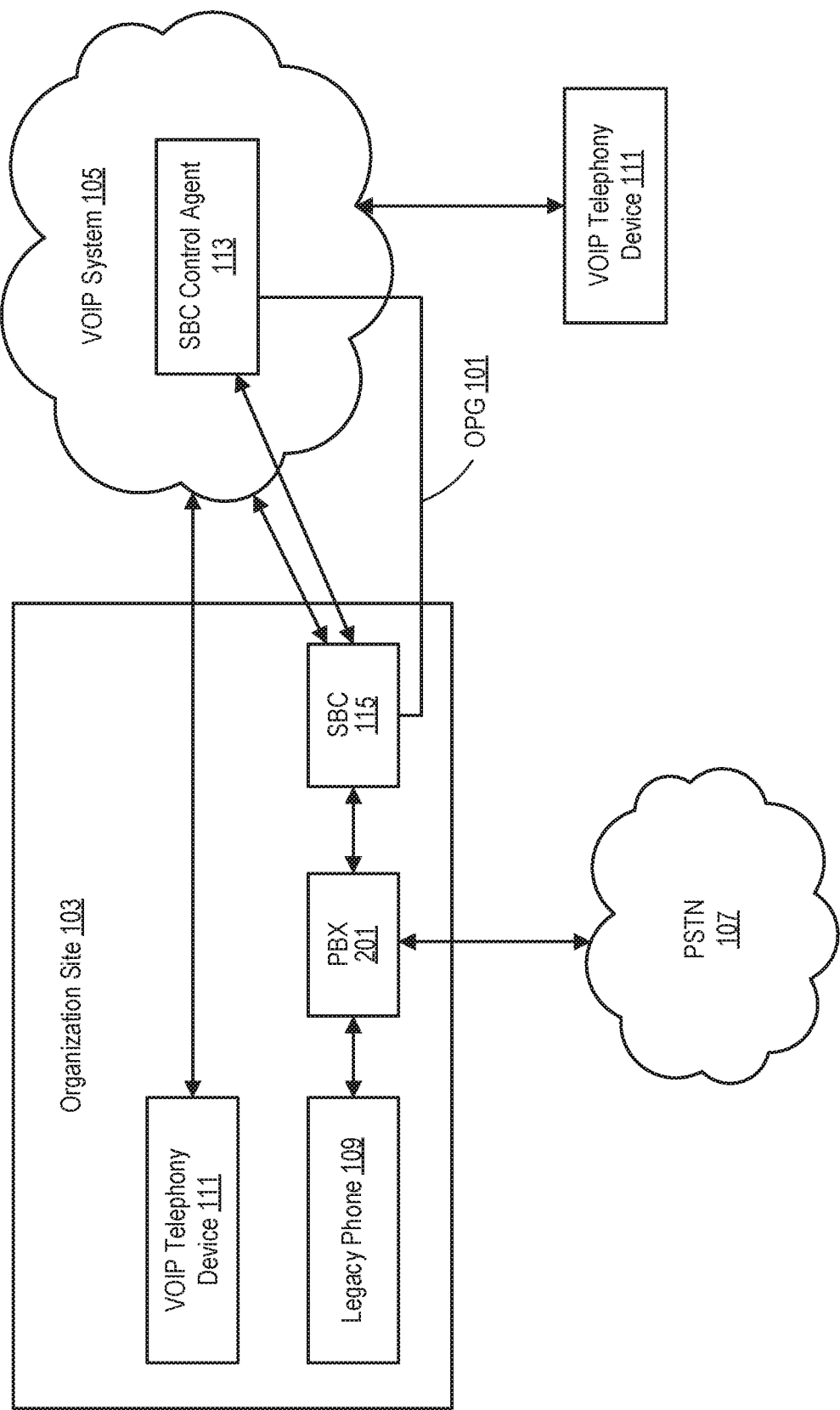
FIG. 2 is a block diagram illustrating an OPG deployed at an organization site, and interconnecting a VoIP system and a PBX, according to some implementations.

FIG. 2 is a block diagram illustrating an exemplary on premises gateway device (OPG) 101 deployed in an organization site 103, and interconnecting a VoIP system 105 and a PBX 201, according to some implementations. In the example implementation illustrated in FIG. 2, the OPG 101 communicates with the PBX 201, for example by using Time-division Multiplexing (TDM) or SIP in the case of a VoIP PBX 201$_{VoIP}$ (not illustrated) as described below. The OPG 101 also communicates with the VoIP system 105, for example using SIP. The PBX 201 communicates with the PSTN 107, e.g., using TDM. As described above, in implementations other than the specific ones illustrated in FIGS. 1 and 2, the organization may receive its phone service through a VoIP provider separate from the VoIP system 105. In this case, a VoIP PBX 201$_{VoIP}$ could be utilized, which could be connected to the external telephone system using, e.g., SIP.

In the specific implementation illustrated in FIG. 2, legacy phones 109 within the organization site 103 are interconnected to the PBX 201, and VoIP telephony devices 111 both within and outside of the organization site 103 are interconnected to the VoIP system 105.

PBXs 201 enable multiple telephones that are part of the PBX exchange to directly connect without using the PSTN 107 or any external telephone network. One advantage of this is the use of extensions (e.g., four or five digit), rather than full telephone numbers, to place calls between telephones within the exchange. Parties within organizations (e.g., companies, educational institutions, government departments, etc.) frequently use such extensions to place calls to each other, and may not even know the full numbers of the other parties. The OPG 101 extends the use of extensions to calls made to or from VoIP telephony devices 111 through the VoIP system 105, outside of the PBX. As explained above in conjunction with FIG. 1, the OPG 101 routes telephone calls to telephone numbers assigned by the organization's telephone service provider to other devices, such as VoIP telephony devices 111 interconnected to the VoIP system 105. The OPG 101 can further track extensions associated with such telephone numbers by the PBX 201, and port the extensions along with the numbers. Thus, when calls are placed through the PBX 201 (e.g., from legacy telephones 109 within the organization site 103) to an extension of a number associated with a VoIP telephony device 111 outside of the PBX 201, the OPG 101 can route the call to the VoIP telephony device 111 through the VoIP system 105. When calls are made to extensions from VoIP telephony device 111 through the VoIP system 105, the OPG 101 can route the calls to the destination, either through the PBX 201 or the VoIP system 105 as appropriate, depending upon whether the destination telephone is within or outside of the PBX exchange.

It is to be understood that the functionalities described in conjunction with FIG. 1 can also be performed by the OPG 101 in the implementation in FIG. 2, with the OPG communicating with the PBX 201 instead of the PSTN 107 directly.

Figure 3:
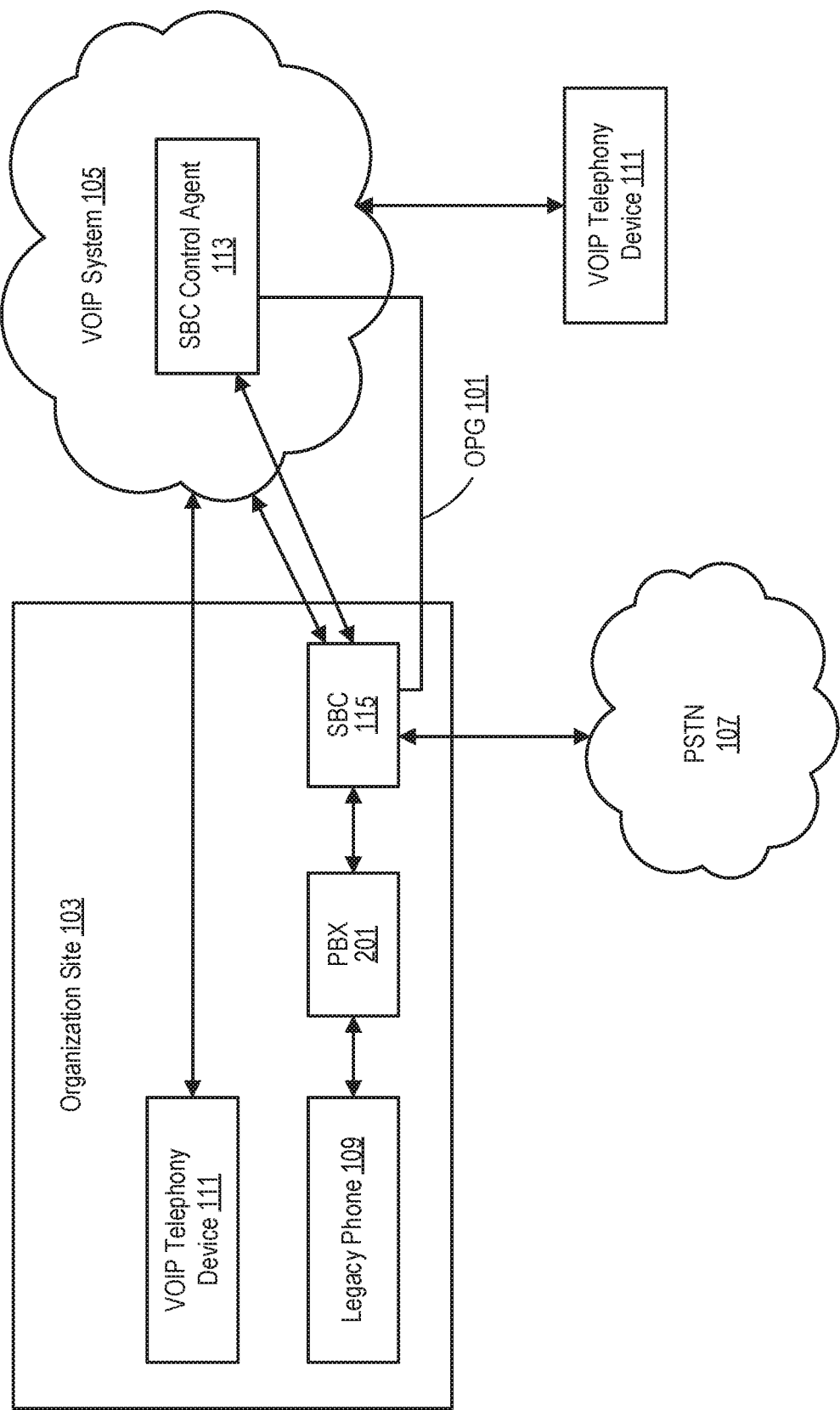
FIG. 3 is a block diagram illustrating an OPG deployed at an organization site, and interconnecting a VoIP system, a PBX, a PSTN and various telephony devices, according to some implementations.

FIG. 3 is a block diagram illustrating an OPG 101 deployed at an organization site 103, and interconnecting a VoIP system 105, a PBX 201, a PSTN 107, a legacy phone 109 and multiple VoIP telephony devices 111, according to some implementations. In the example implementation illustrated in FIG. 3, the OPG 101 communicates with the PBX 201 as in the implementation of FIG. 2, for example by TDM (SIP in the case of a VoIP PBX 201$_{VoIP}$). However, rather than the PBX 201 being connected directly to the PSTN 107 as in FIG. 2, the OPG 101 is connected to the PSTN 107, as in FIG. 1. Thus, communication between the PBX 201 and the PSTN 107 is via the OPG 101. In addition to communicating with the PBX 201, the OPG 101 communicates with the VoIP system 105, for example using SIP, and with the PSTN 107, e.g., using TDM.

In the specific implementation illustrated in FIG. 3, legacy phones 109 within the organization site 103 are interconnected to the PBX 201, which is in turn interconnected to the OPG 101, which is interconnected to the PSTN 107. VoIP telephony devices 111 both within and outside of the organization site 103 are interconnected to the VoIP system 105, which is interconnected to the OPG 101. It is to be understood that the functionalities described in conjunction with FIGS. 1 and 2 can also be performed by the OPG 101 in the implementation in FIG. 3, with the OPG 101 communicating with the PBX 201 and the PSTN 107.

Another benefit that can be provided by the OPG 101 is secure transfer of phone calls originating from outside of the VoIP system 105 (e.g., PSTN calls) between VoIP servers in the VoIP system 105. For example, suppose a caller operating an external telephone 109 places a call to an automated VoIP telephony device 111 of the VoIP system 105 (e.g., by calling a general information number for a company). In the implementations of FIG. 1 or 2, this call would be routed from the external telephone 109 to the VoIP server by the OPG 101. Suppose the VoIP server answers and plays an Interactive Voice Response (IVR) menu that instructs the caller to, for example, "Press 1 for Sales or Press 2 for support." The caller could then press, e.g., 2, and be transferred to a different VoIP telephony device 111 (which can in this context be thought of as a second VoIP server as it is not instantiated as a single VoIP phone but a telephony interface into a department or the like) associated with the support team, and ultimately to a member of the support team, and a conversation would ensue until the support center or the caller hangs up. What happens in this scenario, at a high level is that the call goes from the external telephone 109 to the OPG 101 to the first VoIP server in the VoIP system 105, which plays the IVR menu. However, upon receiving the pressed digit from the caller, the TE1 determine that the call is to be transferred to the second VoIP server, in this example the one associated with the support team.

When transferring calls to VoIP servers and other VoIP telephony devices 111 within the VoIP system 105, it can be desirable to use a secure communication protocol to establish a secure connection between the originating telephone and the VoIP server to which the call is being transferred. Recall that the VoIP servers and other VoIP telephony devices 111 can be in the form of programmable computers, subject to attack and compromise, and it is prudent to secure incoming communication, especially in the case of organization level VoIP servers. For this reason, VoIP system may use a secure protocol such as Secure Real-Time Transport Protocol (SRTP or Secure RTP). SRTP is an extension to RTP (Real-Time Transport Protocol) that incorporates enhanced security features such as encryption, key exchange, message authentication and integrity and replay attack protection. Like RTP, it is suitable for use in VoIP communications.

Without the use of the OPG 101 functionality described herein, attempting to transfer the PSTN call from the first VoIP server to the second VoIP server where the second VoIP server is expecting a secure media communication channel via SRTP would fail-instead of being transferred the call would drop after the caller pressed a digit. This is the case because the media communication channel between the OPG 101 and the second VoIP server require encryption keys, but the keys were never exchanged in the signaling, resulting in an OPG 101 and the second VoIP server being unable to decrypt each other's media streams.

In one implementation, the OPG 101 solves this shortcoming by using Third Party Call Control (3PCC) to facilitate transfer of the PSTN call from the first to the second VoIP server. 3PCC is an Internet Engineering Task Force (IETF) standard. The OPG 101 can facilitate the transfer of the call from the first to the second VoIP server using 3PCC as follows. The first VoIP server first sends an INVITE to the OPG 101 (1). In response, the OPG 101 sends an offer to the first VoIP server, offer1 (2). The first VoIP server needs to send its answer to offer1 in the ACK to the OPG 101. To obtain this answer, the first VoIP server sends the offer1 which it received from the OPG 101 in an INVITE to the second VoIP server (3). In response, the second VoIP server sends an OK to the first VoIP server (4). This OK contains the answer to offer1, answer1. The first VoIP server sends an ACK to the second VoIP server (5), and sends answer1 in the ACK it owes to the OPG 101 (6). Because the offer was generated by the OPG 101, and the answer generated by the second VoIP server, the actual established session is between the OPG 101 and the second VoIP server. Therefore, traffic flows between the OPG 101 and the second VoIP server (7). In this description, "offer1" and "answer1" are signaling messages that contain the security keys from OPG 101 to the second VoIP server and from the second VoIP server to the OPG 101, which are necessary to establish a secure channel between the OPG 101 and the second VoIP server By employing 3PCC as described above, the OPG 101 enables a PSTN gateway solution that facilitates both (1) secure media channel functionality while simultaneously providing for (2) transfer features used for handling telephony features such as IVR menus. It is to be understood that 3PCC does not, by itself, provide this security, but when applied by the OPG 101 as described above, it is able to be used to enable secure media connections.

In addition to the implementations and functionalities described above, OPGs 101 have many other uses as well. For example, OPGs 101 can be utilized to support SIP trunking, for example in scenarios in which PSTN access is provide by the VoIP system 105. As another example, OPGs 101 can be utilized to support interconnection of a VoIP system 105 and High-Density Analog Telephone Adapter telephony devices (e.g., campus emergency phones, elevator phones, factory floor phones, etc.).

As will be understood by those familiar with the art, the invention may be embodied in other specific forms without departing from the spirit or essential characteristics thereof.

Likewise, the particular naming and division of the portions, modules, agents, managers, components, functions, procedures, actions, layers, features, attributes, methodologies, data structures, and other aspects are not mandatory, and the mechanisms that implement the invention or its features may have different names, divisions and/or formats. The foregoing description, for purpose of explanation, has been described with reference to specific examples. However, the illustrative discussions above are not intended to be exhaustive or limiting to the precise forms disclosed. Many modifications and variations are possible in view of the above teachings. The examples were chosen and described in order to best explain relevant principles and their practical applications, to thereby enable others skilled in the art to best utilize various examples with or without various modifications as may be suited to the particular use contemplated.

What is claimed is:

1. An on premises gateway located within an organization site wherein:
   the on premises gateway located within the organization site communicatively couples a remotely located voice over internet protocol (VoIP) system, a public switched telephone network (PSTN), at least one VoIP telephony device, and at least one non-VoIP legacy telephone device;
   the on premises gateway located within the organization site communicates with the PSTN using a switching protocol;
   the on premises gateway located within the organization site communicates with the VoIP system using a VoIP protocol; and
   the on premises gateway located within the organization site extends a service of the PSTN to at least one VoIP telephony device interconnected to the VoIP system; and
   the on premises gateway located within the organization site ports a specific telephone number previously assigned by the legacy telephone service provider, from a specific non-VoIP legacy telephone device to a specific VoIP telephony device, without requiring the legacy telephone service provider to port the specific legacy telephone number, wherein porting the specific legacy telephone number further comprises the on premises gateway located within the organization site reassigning the specific legacy telephone number previously assigned by a legacy telephone service provider, from the specific non-VoIP legacy telephone device to the specific VoIP telephony device, at the level of the organization site outside of the PSTN;
   wherein the on premises gateway located within the organization site subsequently routes all inbound calls placed to the specific ported legacy telephone number to the specific VoIP telephony device to which the telephone number was ported, at the level of the organization site outside of the PSTN.

2. The on premises gateway of claim 1 wherein:
   the switching protocol further comprises Time-division Multiplexing (TDM) and the VoIP protocol further comprises Session Initiation Protocol (SIP).

3. The on premises gateway of claim 1 wherein:
   the on premises gateway routes outbound calls from the at least one VoIP telephony device to the PSTN.

4. The on premises gateway of claim 1 wherein:
   the on premises gateway reassigns at least one specific telephone number assigned by a legacy telephone service provider, from at least one specific non-VoIP legacy telephone device to at least one specific VoIP telephony device, for a specific period of time, thereby porting the at least one specific telephone number previously assigned by the legacy telephone service provider to the at least one specific VoIP telephony device for the specific period of time.

5. The on premises gateway of claim 4 wherein:
   the specific period of time further comprises a single telephony session.

6. The on premises gateway of claim 4 wherein:
   the specific period of time further comprises an open-ended period of time.

7. The on premises gateway of claim 1 wherein:
   the on premises gateway extends support for calling an emergency services telephone number to the VoIP system by routing a call from at least one specific VoIP telephony device through the PSTN to the emergency services telephone number.

8. The on premises gateway of claim 1 wherein:
   the on premises gateway extends support for calling a toll-free number to the VoIP system by routing a call from at least one specific VoIP telephony device through the PSTN to the toll-free telephone number.

9. The on premises gateway of claim 1 wherein:
   the on premises gateway directly connects to a telephone network that limits, blocks or alters caller id information, and provides specific caller id information for calls originating from the at least one VoIP telephony device to the telephone network.

10. The on premises gateway of claim 1 wherein:
    the on premises gateway extends a service of the VoIP system to at least one specific non-VoIP legacy telephone device outside of the VoIP system to which the service would not otherwise be available.

11. The on premises gateway of claim 10 wherein:
    when a call is made from the at least one specific non-VoIP legacy telephone device through the on premises gateway, the on premises gateway obtains information concerning a target party of the call;
    the on premises gateway communicates the obtained information to the at least one specific non-VoIP legacy telephone device; and
    the at least one specific non-VoIP legacy telephone device displays the obtained information.

12. The on premises gateway of claim 1 wherein:
    the on premises gateway securely transfers at least one call originating from outside of the VoIP system from a first VoIP server to a second VoIP server.

13. The on premises gateway of claim 12 wherein:
    the on premises gateway securely transfers at least one call originating from outside of the VoIP system from a first VoIP server to a second VoIP server by utilizing Third Party Call Control.

14. An on premises gateway located within an organization site wherein:
    the on premises gateway located within the organization site communicatively couples a remotely located voice over internet protocol (VoIP) system, at least one VoIP telephony device, at least one non-VoIP legacy telephone device and a private branch exchange (PBX) located within the organization site, the PBX being interconnected to a public switched telephone network (PSTN);
    the on premises gateway located within the organization site communicates with the PBX using a switching protocol;
    the PBX communicates with the PSTN using the switching protocol;

the on premises gateway located within the organization site communicates with the VoIP system using a VoIP protocol; and the on premises gateway located within the organization site extends a service of the PSTN to the at least one VoIP telephony device interconnected to the VoIP system; and the on premises gateway located within the organization site ports a specific telephone number previously assigned by the legacy telephone service provider, from a specific non-VoIP legacy telephone device to a specific VoIP telephony device, without requiring the legacy telephone service provider to port the specific legacy telephone number, wherein porting the specific legacy telephone number further comprises the on premises gateway located within the organization site reassigning the specific legacy telephone number previously assigned by a legacy telephone service provider, from the specific non-VoIP legacy telephone device to the specific VoIP telephony device, at the level of the organization site outside of the PSTN;

wherein the on premises gateway located within the organization site subsequently routes all inbound calls placed to the specific ported legacy telephone number to the specific VoIP telephony device to which the telephone number was ported, at the level of the organization site outside of the PSTN.

15. The on premises gateway of claim 14 wherein:

the switching protocol further comprises Time-division Multiplexing (TDM) and the VoIP protocol further comprises Session Initiation Protocol (SIP).

16. The on premises gateway of claim 14 wherein:

the PBX associates at least one specific shortened extension with the at least one specific legacy telephone number assigned to the at least one specific non-VoIP legacy telephone device by the legacy telephone service provider;

the on premises gateway associates the at least one specific shortened extension with at least one specific VoIP telephony device; and the on premises gateway routes inbound calls placed to the at least one specific shortened extension to the associated at least one specific VoIP telephony device, without requiring the PBX to port the specific extension to the at least one specific VoIP telephony device.

17. The on premises gateway of claim 16 wherein:

when calls are made through the PBX from the at least one non-VoIP legacy telephone number within the organization site to the at least one specific shortened extension, the on premises gateway routes the calls to the associated at least one specific VoIP telephony device, through the VoIP system; and when calls are made through the VoIP system to the at least one specific shortened extension, the on premises gateway routes the calls to the associated at least one specific VoIP telephony device, through the VoIP system.

18. An on premises gateway located within an organization site wherein:

the on premises gateway located within the organization site communicatively couples a remotely located voice over internet protocol (VoIP) system, a public switched telephone network (PSTN), at least one VoIP telephony device, and a private branch exchange (PBX) located within the organization site;

the PBX communicates with at least one non-VoIP legacy telephone device using a switching protocol;

the on premises gateway located within the organization site communicates with the PSTN using a switching protocol;

the on premises gateway located within the organization site communicates with the VoIP system using a VoIP protocol; and the on premises gateway located within the organization site extends a service of the PSTN to at least one VoIP telephony device interconnected to the VoIP system; and the on premises gateway located within the organization site ports a specific telephone number previously assigned by the legacy telephone service provider, from a specific non-VoIP legacy telephone device to a specific VoIP telephony device, without requiring the legacy telephone service provider to port the specific legacy telephone number, wherein porting the specific legacy telephone number further comprises the on premises gateway located within the organization site reassigning the specific legacy telephone number previously assigned by a legacy telephone service provider, from the specific non-VoIP legacy telephone device to the specific VoIP telephony device, at the level of the organization site outside of the PSTN, wherein the on premises gateway located within the organization site subsequently routes all inbound telephone calls placed to the specific ported legacy phone number to the specific VoIP telephony device to which the telephone number was ported, at the level of the organization site outside of the PSTN.

19. The on premises gateway of claim 18 wherein:

the switching protocol further comprises Time-division Multiplexing (TDM) and the VoIP protocol further comprises Session Initiation Protocol (SIP).

* * * * *